US012659831B2

(12) United States Patent (10) Patent No.: US 12,659,831 B2
Yuan et al. (45) Date of Patent: Jun. 16, 2026

(54) PUCCH RESET AFTER PER-TRP BEAM FAILURE RECOVERY

(71) Applicant: QUALCOMM Incorporated, San Diego, CA (US)

(72) Inventors: Fang Yuan, Beijing (CN); Yan Zhou, San Diego, CA (US); Wooseok Nam, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 18/550,902

(22) PCT Filed: Apr. 30, 2021

(86) PCT No.: PCT/CN2021/091642
§ 371 (c)(1),
(2) Date: Sep. 15, 2023

(87) PCT Pub. No.: WO2022/227048
PCT Pub. Date: Nov. 3, 2022

(65) Prior Publication Data
US 2024/0196295 A1 Jun. 13, 2024

(51) Int. Cl.
*H04W 36/30* (2009.01)
*H04L 5/00* (2006.01)
*H04W 36/00* (2009.01)

(52) U.S. Cl.
CPC ......... *H04W 36/305* (2018.08); *H04L 5/0035* (2013.01); *H04L 5/0055* (2013.01); *H04W 36/00692* (2023.05)

(58) Field of Classification Search
CPC ......... H04W 36/305; H04W 36/00692; H04W 76/19; H04W 16/28; H04L 5/0035; H04L 5/0055; H04L 2001/0097; H04L 1/1822; H04B 7/024; H04B 7/06964; H04B 7/06968
See application file for complete search history.

(56) References Cited

U.S. PATENT DOCUMENTS

2021/0112619 A1     4/2021   Bai et al.
2021/0315041 A1*   10/2021   Matsumura ........... H04W 72/21
(Continued)

FOREIGN PATENT DOCUMENTS

CN        109997397 A      7/2019
WO        2020151472 A1    7/2020
WO        2020164566 A1    8/2020

OTHER PUBLICATIONS

Lenovo, et al., "Discussion of Multi-TRP/panel Transmission", 3GPP TSG RAN WG1 Meeting #98, R1-1908720_MULTI_TRP_FINAL, 3rd Generation Partnership Project , Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019, 19 Pages, XP051765328, p. 7.
(Continued)

*Primary Examiner* — Hashim S Bhatti
(74) *Attorney, Agent, or Firm* — Dinsmore & Shohl LLP

(57) ABSTRACT
Aspects of the present disclosure relate to wireless communications, and more particularly, to techniques for performing beam failure recovery in scenarios involving multiple transmitter receiver points.

24 Claims, 16 Drawing Sheets

800

802
TRANSMIT, WHILE COMMUNICATING WITH AT LEAST A FIRST TRANSMITTER RECEIVER POINT (TRP) ASSOCIATED WITH A FIRST CONTROL RESOURCE SET (CORESET) AND A SECOND TRP ASSOCIATED WITH A SECOND CORESET, A BEAM FAILURE RECOVERY REQUEST (BFRQ) FOR THE FIRST TRP

804
RECEIVE A BEAM FAILURE RESPONSE (BFR) AFTER TRANSMITTING THE BFRQ

806
AFTER RECEIVING THE BFR, TRANSMIT PHYSICAL UPLINK CONTROL CHANNEL (PUCCH) ASSOCIATED WITH THE FIRST TRP USING A NEW BEAM INDICATED IN THE BFRQ

(56)                    References Cited

U.S. PATENT DOCUMENTS

| | | | | |
|---|---|---|---|---|
| 2022/0109489 A1* | 4/2022 | Zhu | ................. | H04W 80/02 |
| 2022/0149922 A1* | 5/2022 | Wang | ................. | H04W 76/19 |
| 2022/0377586 A1* | 11/2022 | Yang | ................. | H04W 24/08 |
| 2023/0139655 A1* | 5/2023 | Guo | ................. | H04W 36/085 |
| | | | | 370/329 |
| 2023/0199528 A1* | 6/2023 | Kang | ................. | H04W 24/08 |
| | | | | 370/328 |
| 2023/0247626 A1* | 8/2023 | Go | ................. | H04B 7/06964 |
| | | | | 370/329 |

OTHER PUBLICATIONS

Samsung: "Enhancements on Multi-TRP/Panel Transmission", 3GPP TSG RAN WG1 Meeting #99, R1-1912482, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019, 13 Pages, XP051820062, p. 5-p. 6.
Supplementary European Search Report—EP21938522—Search Authority—Munich—Dec. 18, 2024.
ZTE: "Enhancements on Beam Management for Multi-TRP", 3GPP TSG RAN WG1 Meeting #104b-e, R1-2102663, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021- Apr. 20, 2021, Apr. 7, 2021, 17 Pages, XP052177671, p. 8-p. 12.
Fujitsu: "Enhancements on Beam Management for Multi-TRP", 3GPP TSG RAN WG1 #104-e, R1-2100739, Jan. 25, 2021-Feb. 5, 2021, Jan. 18, 2021, 4 Pages, The Whole Document.
International Search Report and Written Opinion—PCT/CN2021/091642—ISA/EPO—Jan. 26, 2022.

* cited by examiner

Separate A/N Feedback

| | DCI1 | PDSCH1 | PUCCH1(A/N1) | |
| | DCI2 | PDSCH2 | | PUCCH2(A/N2) |

Joint A/N Feedback

| | DCI1 | PDSCH1 | |
| | | | PUCCH(A/N1, A/N2) |
| | DCI2 | PDSCH2 | |

800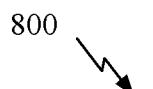

802

TRANSMIT, WHILE COMMUNICATING WITH AT LEAST A FIRST TRANSMITTER RECEIVER POINT (TRP) ASSOCIATED WITH A FIRST CONTROL RESOURCE SET (CORESET) AND A SECOND TRP ASSOCIATED WITH A SECOND CORESET, A BEAM FAILURE RECOVERY REQUEST (BFRQ) FOR THE FIRST TRP

804

RECEIVE A BEAM FAILURE RESPONSE (BFR) AFTER TRANSMITTING THE BFRQ

806

AFTER RECEIVING THE BFR, TRANSMIT PHYSICAL UPLINK CONTROL CHANNEL (PUCCH) ASSOCIATED WITH THE FIRST TRP USING A NEW BEAM INDICATED IN THE BFRQ

FIG. 8

900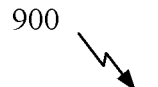

902

RECEIVE FROM A USER EQUIPMENT (UE), WHILE THE UE IS COMMUNICATING WITH AT LEAST A FIRST TRANSMITTER RECEIVER POINT (TRP) ASSOCIATED WITH A FIRST CONTROL RESOURCE SET (CORESET) AND A SECOND TRP ASSOCIATED WITH A SECOND CORESET, A BEAM FAILURE RECOVERY REQUEST (BFRQ) FOR THE FIRST TRP

904

TRANSMIT A BEAM FAILURE RESPONSE (BFR) TO THE UE AFTER RECEIVING THE BFRQ

906

AFTER TRANSMITTING THE BFR, PROCESS PHYSICAL UPLINK CONTROL CHANNEL (PUCCH) FROM THE UE ASSOCIATED WITH THE FIRST TRP USING A NEW BEAM INDICATED IN THE BFRQ

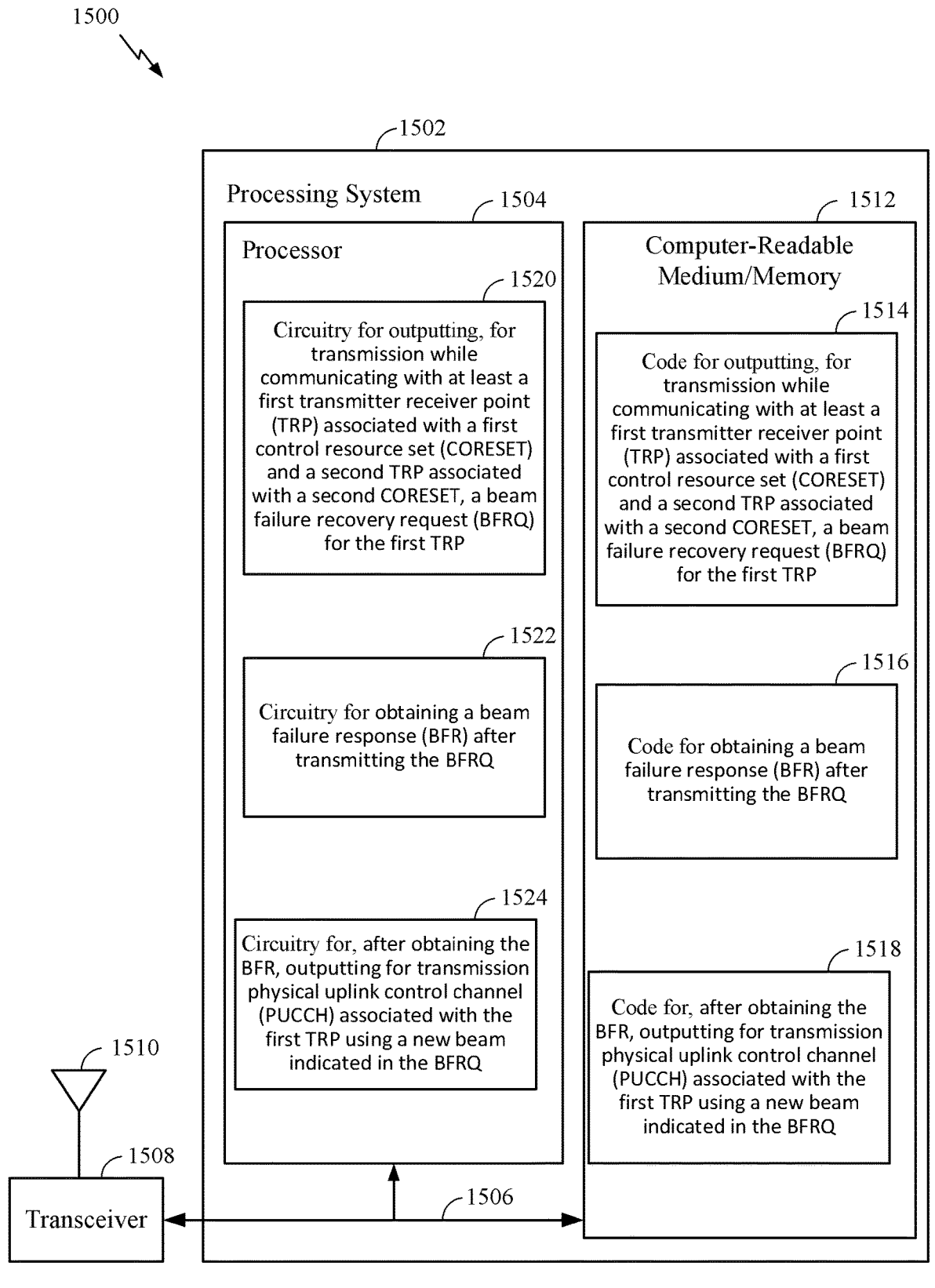

Processing System

1504

Processor

1520

Circuitry for outputting, for transmission while communicating with at least a first transmitter receiver point (TRP) associated with a first control resource set (CORESET) and a second TRP associated with a second CORESET, a beam failure recovery request (BFRQ) for the first TRP

1522

Circuitry for obtaining a beam failure response (BFR) after transmitting the BFRQ

1524

Circuitry for, after obtaining the BFR, outputting for transmission physical uplink control channel (PUCCH) associated with the first TRP using a new beam indicated in the BFRQ

1512

Computer-Readable Medium/Memory

1514

Code for outputting, for transmission while communicating with at least a first transmitter receiver point (TRP) associated with a first control resource set (CORESET) and a second TRP associated with a second CORESET, a beam failure recovery request (BFRQ) for the first TRP

1516

Code for obtaining a beam failure response (BFR) after transmitting the BFRQ

1518

Code for, after obtaining the BFR, outputting for transmission physical uplink control channel (PUCCH) associated with the first TRP using a new beam indicated in the BFRQ

1510

1508

Transceiver

PUCCH RESET AFTER PER-TRP BEAM FAILURE RECOVERY

CROSS-REFERENCE TO RELATED APPLICATIONS

This application is a national stage application under 35 U.S.C. 371 of PCT/CN2021/091642, filed Apr. 30, 2021, which is hereby expressly incorporated by reference herein in its entirety as if fully set forth below and for all applicable purposes.

FIELD OF THE DISCLOSURE

Aspects of the present disclosure relate to wireless communications, and more particularly, to techniques for performing beam failure recovery in scenarios involving multiple transmitter receiver points.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes transmitting, while communicating with at least a first transmitter receiver point (TRP) associated with a first control resource set (CORESET) and a second TRP associated with a second CORESET, a beam failure recovery request (BFRQ) for the first TRP, receiving a beam failure response (BFR) after transmitting the BFRQ, and after receiving the BFR, transmitting physical uplink control channel (PUCCH) associated with the first TRP using a new beam indicated in the BFRQ.

Certain aspects provide a method for wireless communications by a network entity. The method generally includes receiving from a user equipment (UE), while the UE is communicating with at least a first transmitter receiver point (TRP) associated with a first control resource set (CORESET) and a second TRP associated with a second CORESET, a beam failure recovery request (BFRQ) for the first TRP, transmitting a beam failure response (BFR) to the UE after receiving the BFRQ, and after transmitting the BFR, processing physical uplink control channel (PUCCH) from the UE associated with the first TRP using a new beam indicated in the BFRQ.

Certain aspects provide an apparatus for wireless communications by a user equipment (UE). The apparatus generally includes a processing system configured to communicate with at least a first transmitter receiver point (TRP) associated with a first control resource set (CORESET) and a second TRP associated with a second CORESET; and generate a beam failure recovery request (BFRQ) for the first TRP; and an interface configured to output, for transmission while communicating, the beam failure recovery request (BFRQ) for the first TRP, obtain a beam failure response (BFR) after the transmission of the BFRQ, and after the BFR was received, output, for transmission, physical uplink control channel (PUCCH) associated with the first TRP using a new beam indicated in the BFRQ.

Certain aspects provide an apparatus for wireless communications by a network entity. The apparatus generally includes an interface configured to obtain from a user equipment (UE), while the UE is communicating with at least a first transmitter receiver point (TRP) associated with a first control resource set (CORESET) and a second TRP associated with a second CORESET, a beam failure recovery request (BFRQ) for the first TRP; and a processing system configured to generate a beam failure response (BFR), wherein the interface is further configured to output, for transmission to the UE after the BFRQ was obtained, the beam failure response (BFRQ), and after the BFR was output for transmission, the processing system is further configured to process physical uplink control channel (PUCCH) from the UE associated with the first TRP using a new beam indicated in the BFRQ.

Certain aspects provide a computer-readable medium for wireless communications by a user equipment (UE). The computer-readable medium generally includes codes executable to output, for transmission while communicating with at least a first transmitter receiver point (TRP) associated with a first control resource set (CORESET) and a second TRP associated with a second CORESET, a beam failure recovery request (BFRQ) for the first TRP; obtain a beam failure response (BFR) after the BFRQ was output for transmission; and after the BFR was obtained, output for transmission, physical uplink control channel (PUCCH) associated with the first TRP using a new beam indicated in the BFRQ.

Certain aspects provide a computer-readable medium for wireless communications by a network entity. The computer-readable medium generally includes codes executable to obtain from a user equipment (UE), while the UE is communicating with at least a first transmitter receiver point (TRP) associated with a first control resource set (CORESET) and a second TRP associated with a second CORESET, a beam failure recovery request (BFRQ) for the first TRP; generate a beam failure response (BFR); output, for transmission to the UE after the BFRQ was obtained, the beam failure response (BFRQ); and after the BFR was output for transmission, processing physical uplink control channel (PUCCH) from the UE associated with the first TRP using a new beam indicated in the BFRQ.

Certain aspects provide UEs, network entities, methods, means for, apparatuses, and/or computer readable medium having computer executable codes stored thereon for, performing techniques described herein for processing multi-TRP transmissions.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 8 illustrates example operations for wireless communications by a user equipment (UE), in accordance with certain aspects of the present disclosure.

FIG. 9 illustrates example operations for wireless communications by a network entity, in accordance with certain aspects of the present disclosure.

FIG. 15 illustrates an apparatus with example components capable of performing operations, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
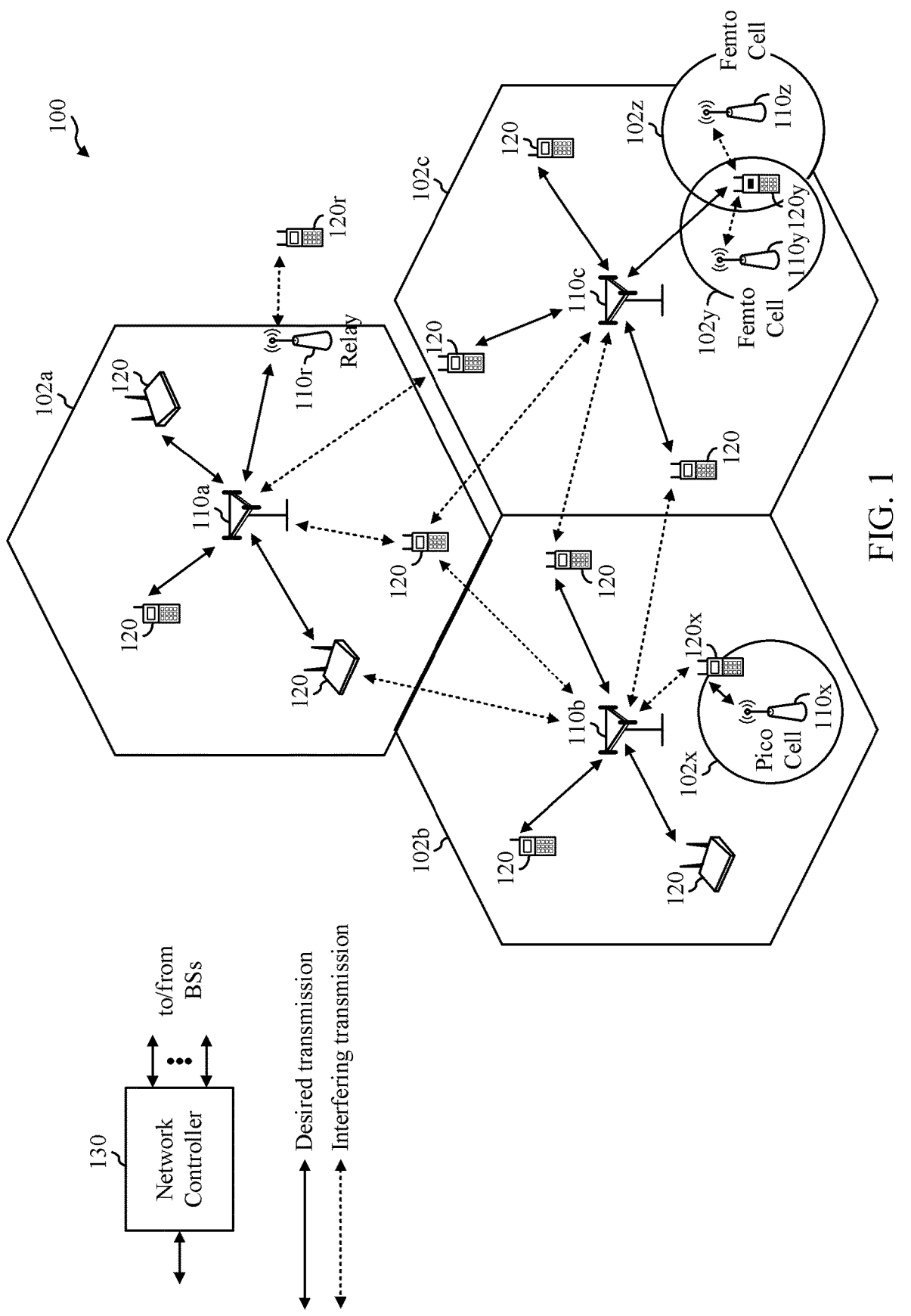
FIG. 1 is a block diagram conceptually illustrating an example telecommunications system, in accordance with certain aspects of the present disclosure.

Aspects of the present disclosure relate to wireless communications, and more particularly, to techniques for performing beam failure recovery in scenarios involving multiple transmitter receiver points.

In some cases, a UE communicating with multiple transmitter receiver points (TRPs or mTRP) may detect a beam failure for one of the TRPs. In such cases, aspects of the present disclosure provide mechanisms for the UE to send a per-TRP beam failure recovery request (BFRQ), meaning a BFRQ specific to the failing TRP, and to determine timing for performing a beam reset for physical uplink control channel (PUCCH) transmissions in such cases.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the network 100 may include one or more UEs 120 configured to perform operations 800 of FIG. 8 to perform PUCCH beam reset in an mTRP scenario. Similarly, the network 100 may include one or more base stations (BSs) 110 (or TRPs) configured to perform operations 900 of FIG. 9 to participate in beam failure recover (BFR) with a UE performing operations 800 of FIG. 8.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node, such as a UE or a BS, may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz).

Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
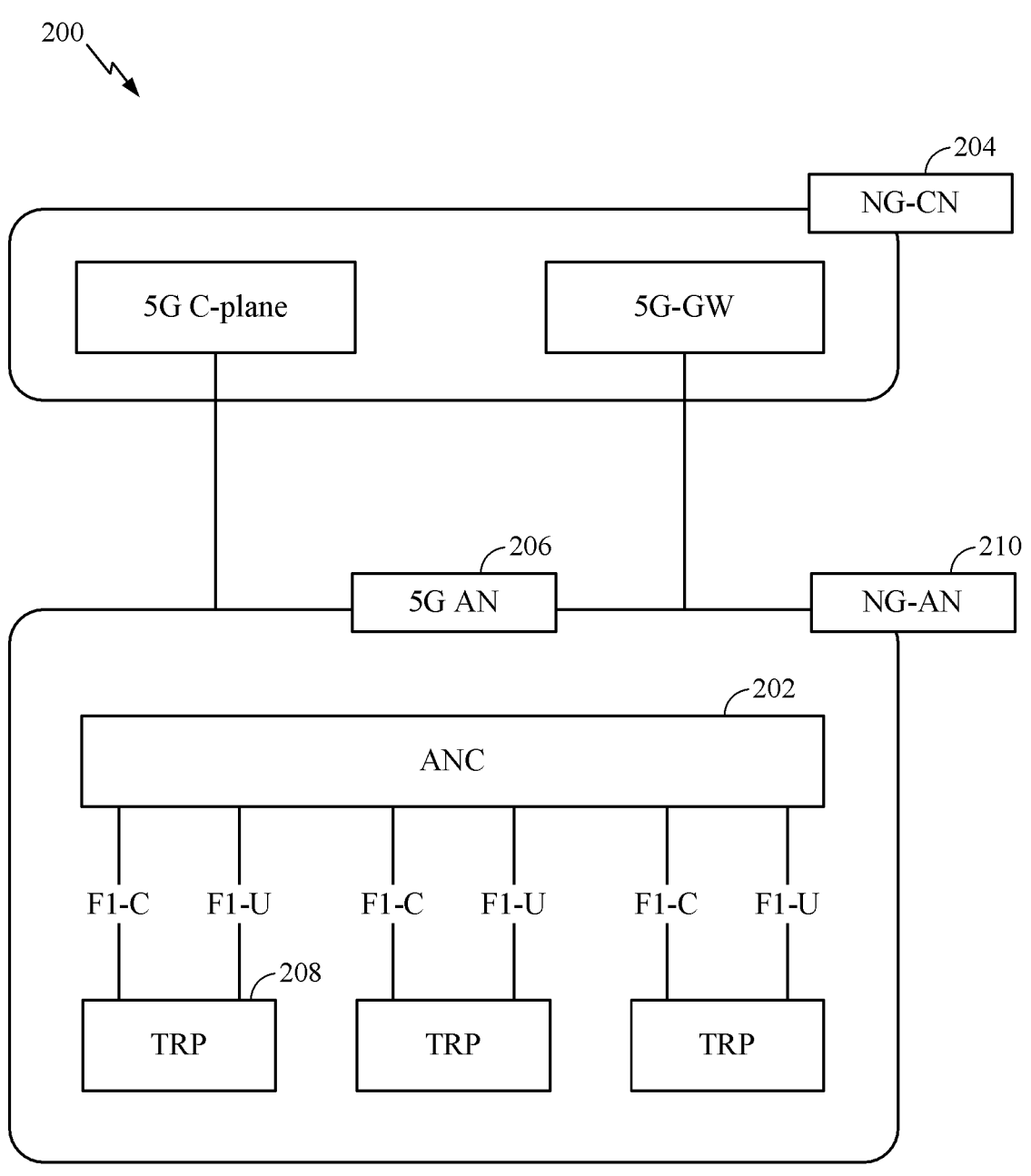
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
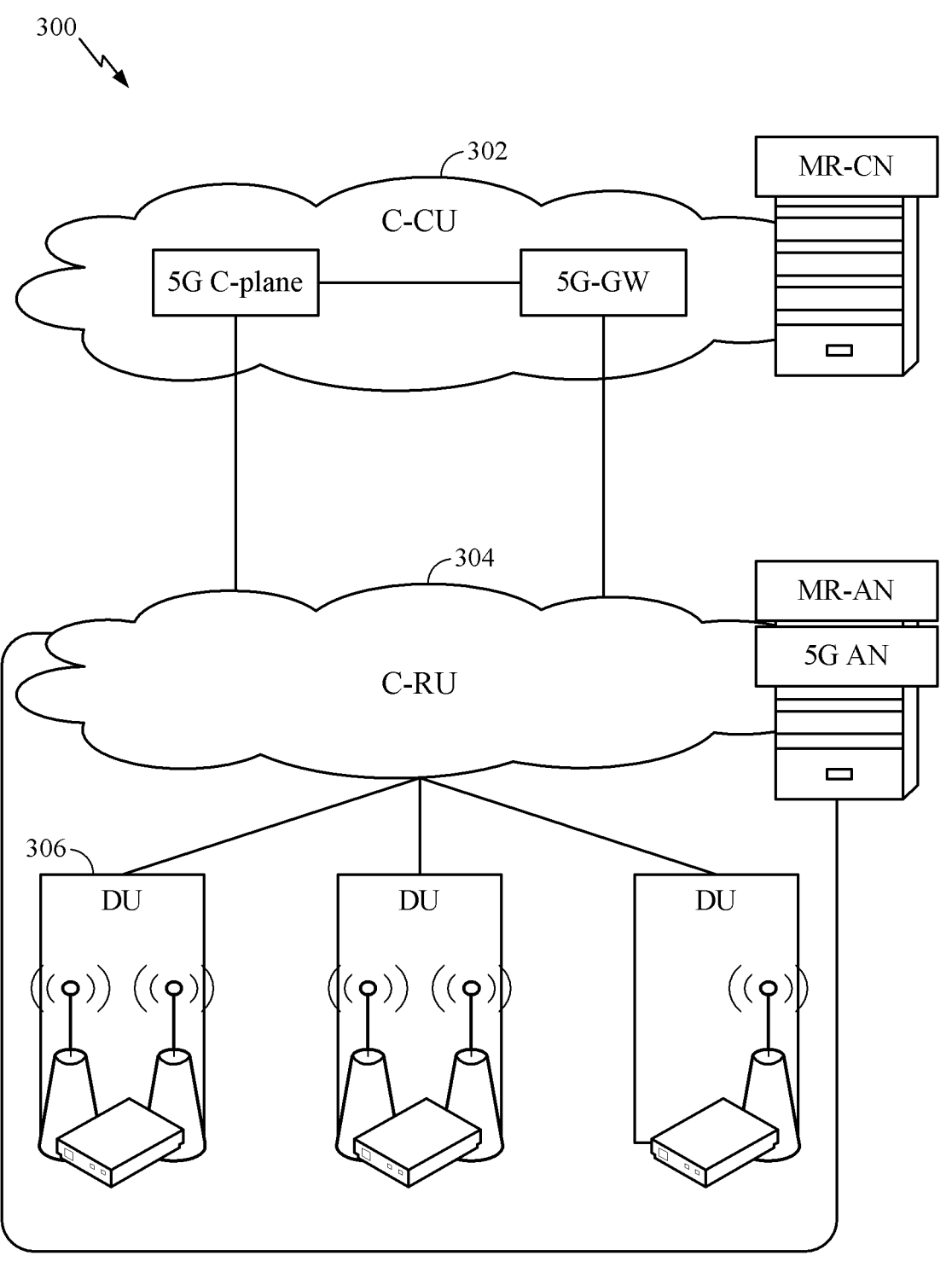
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
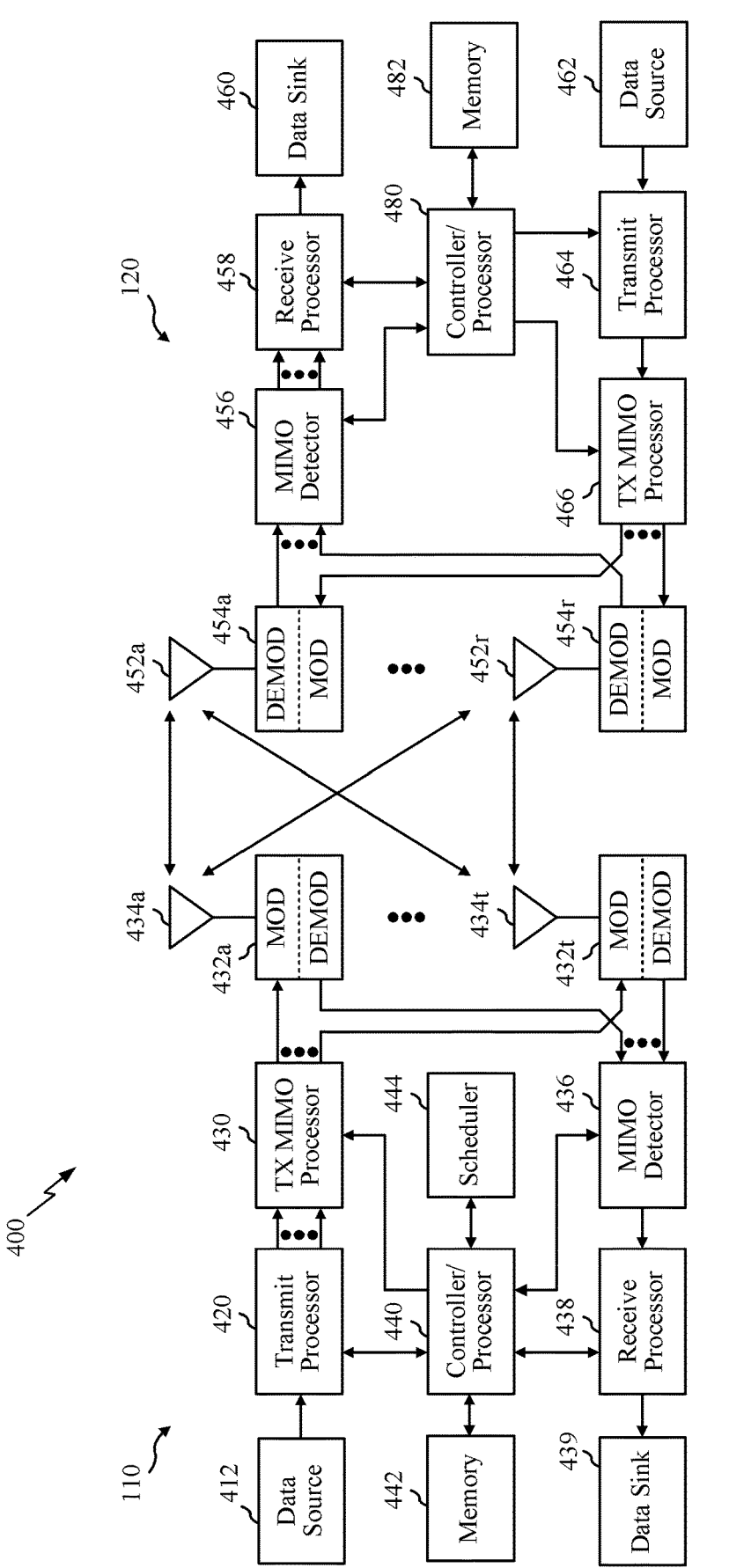
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may perform (or be used to perform) operations 800 of FIG. 8. Similarly, antennas 434, processors 420, 430, 438, and/or controller/processor 440 of the BS 110 may perform (or be used to perform) operations 900 of FIG. 9.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 5:
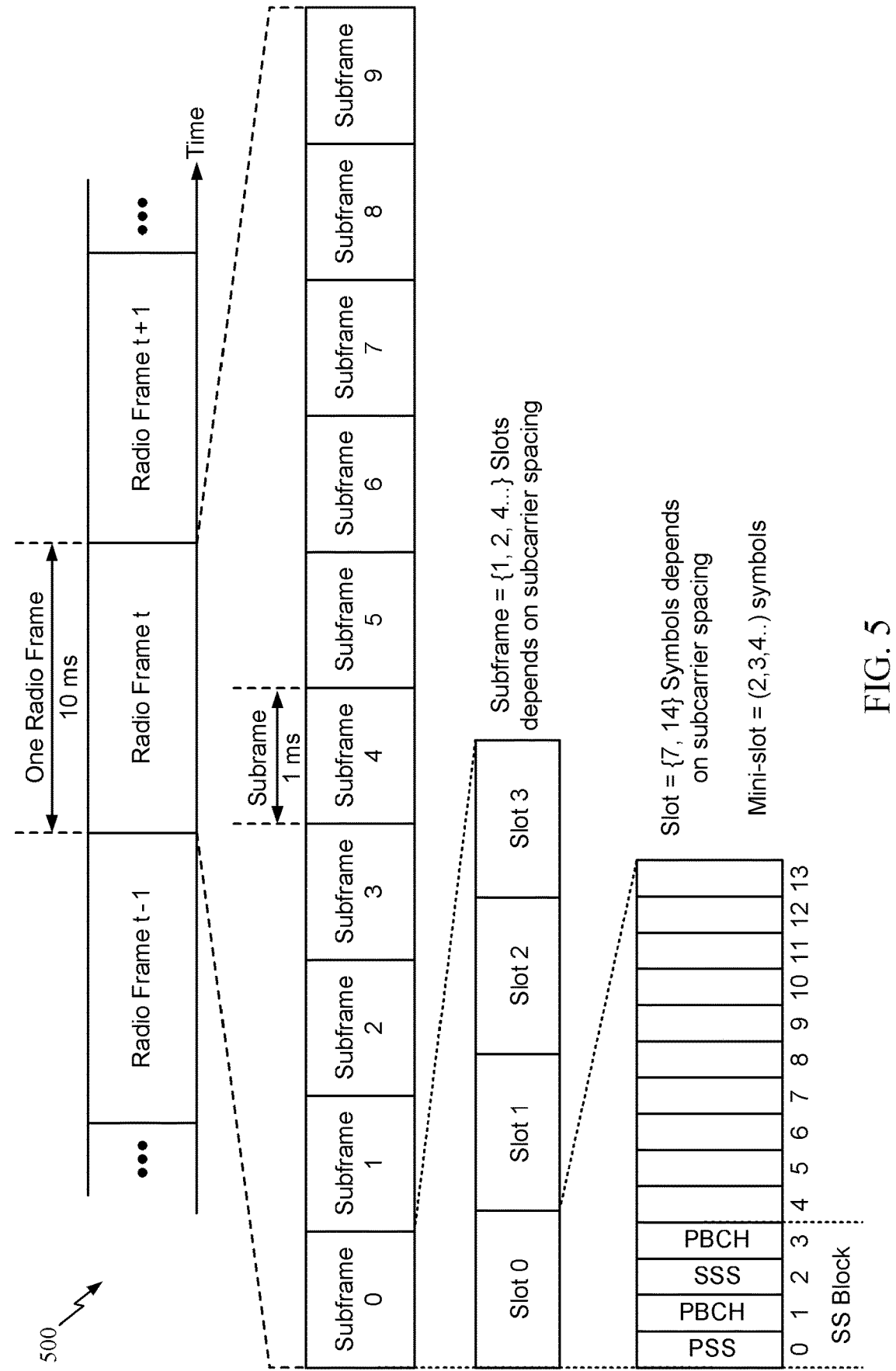
FIG. 5 illustrates example frame and subframe formats, in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Multi-TRP Scenarios

Figure 6:
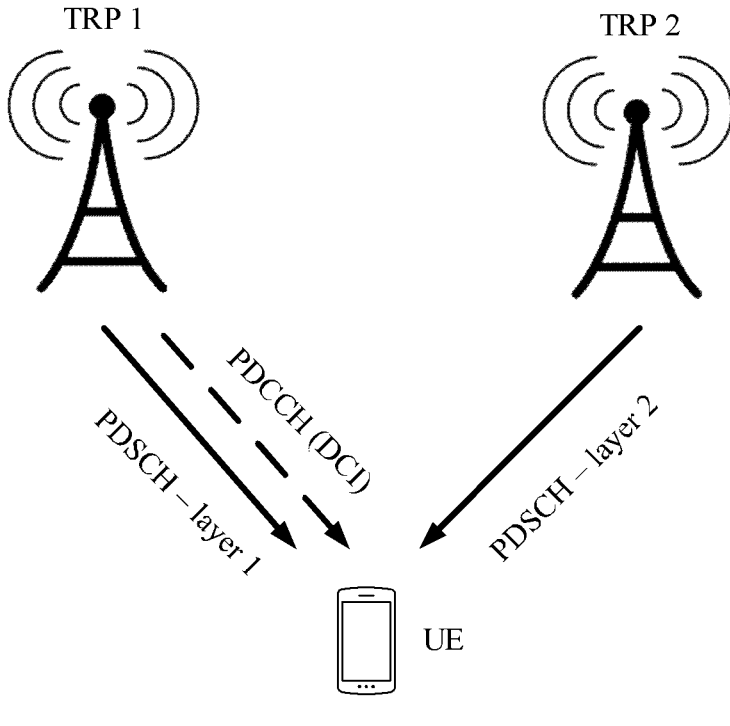
FIGS. 6, 7A and 7B illustrate examples of single-DCI and multi-DCI multi-TRP scenarios, in accordance with certain aspects of the present disclosure.
Figure 7A:
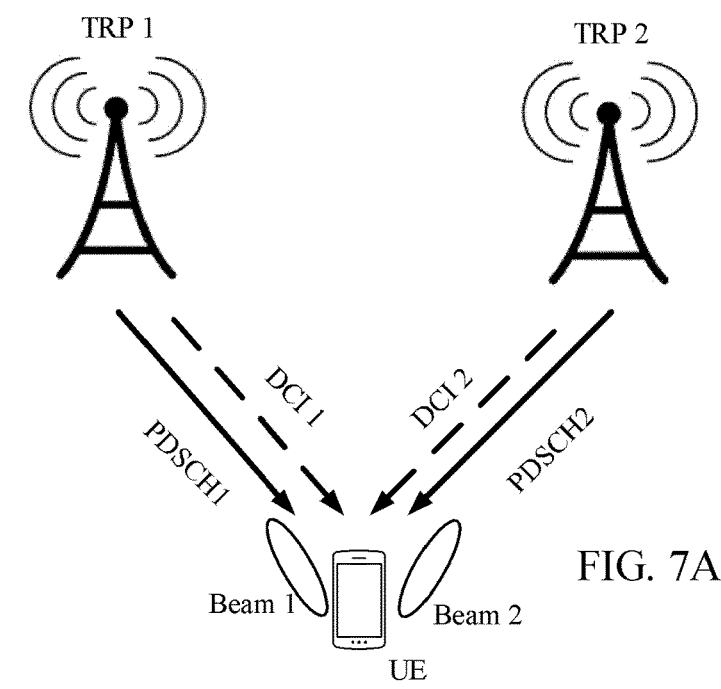
Figure 7B:
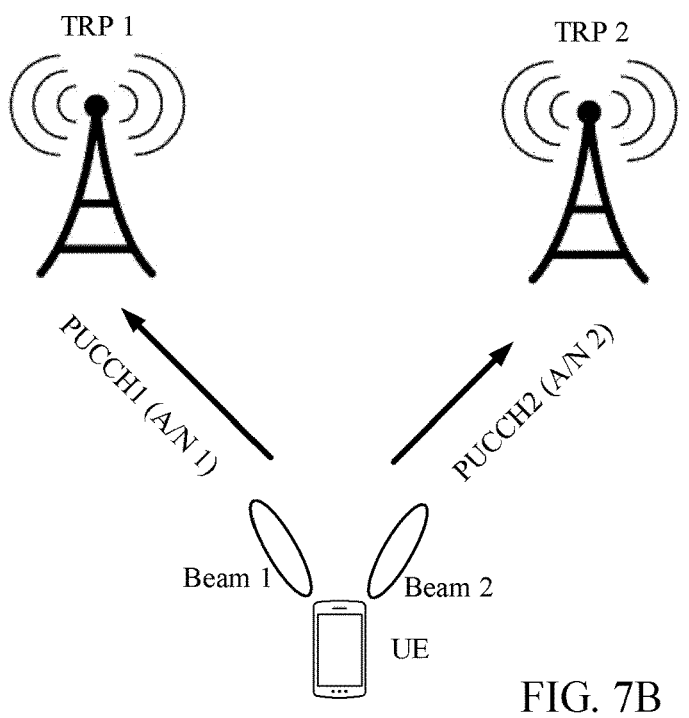

In 3GPP new radio (NR) Release 16 (R16), a multi-TRP operation was introduced to increase system capacity as well as reliability. FIGS. 6, 7A and 7B illustrate examples scenarios of multi-TRP operation, in which aspects of the present disclosure may be practiced.

As shown in FIG. 6, in some examples, the multi-TRP transmissions may be configured based on a single downlink control information (DCI). The single DCI (e.g., transmitted via a PDCCH from a first TRP (TRP 1) schedules a physical downlink shared channel (PDSCH) from TRP 1 and a PDSCH from a second TRP (TRP 2).

Multi-TRP operation configured based on a single DCI communication may best suited for deployments with an ideal backhaul or backhaul with a small delay and may involve various transmission schemes. The transmissions schemes may include, for example, a spatial division multiplexing (SDM) scheme, frequency division multiplexing (FDM), or time division multiplexing (TDM).

With SDM, also known as non-coherent joint transmission (NCJT), a first set of layers are transmitted from TRP 1 and a second set of layers are transmitted from TRP 2. The transmissions may utilize the same frequency domain resource allocation (FDRA) and time division resource allocation (TDRA). With FDM, the transmissions from the two TRPs may have the same rank and same code word (CW), but with different FDRAs across the two TRPs. With TDM, the transmissions from the two TRPs may have the same rank and same CW, but with different TDRAs across the two TRPs.

In some cases, PDSCH may be sent in multiple parts. For example, TRP 1 may send a first part (on a first set of layers, with a first set of FDRA, and a first set of TDRA) and TRP 2 may send a second part (on a second set of layers, with a second set of FDRA, and a second set of TDRA).

As shown in FIG. 7A, in some examples, the multi-TRP transmissions may be configured based on multiple DCIs. In the multi-DCI case, Each DCI schedules an individual PDSCH (similar to CA framework). For example, a first DCI (DCI 1) from TRP 1 (e.g., transmitted in PDCCH 1) schedules PDSCH 1 from TRP 1, while a second DCI (e.g., DCI 2 transmitted in PDCCH 2) schedules PDSCH 2 from TRP 2. The two scheduled PDSCH may be overlapped, non-overlapped, or partially overlapped in frequency domain or time domain.

As shown in FIG. 7B, in some cases, the UE may provide separate acknowledgement/negative acknowledgment (A/N) feedback for each of the PDSCH transmissions. For example, the UE may separately provide A/N feedback for PDSCH 1 (A/N 1) via a first PUCCH transmission (PUCCH 1) and A/N feedback for PDSCH 2 (A/N 2) via a second PUCCH transmission (PUCCH 2).

Multiple DCI (mDCI) based M-TRP with separate A/N feedback, as shown in FIG. 7B, may be used, for example, when two TRPs do not have ideal backhaul (e.g., with some latency). In other cases, the UE may provide joint A/N feedback for both PDSCH 1 and PDSCH 2 in a single PUCCH. mDCI based M-TRP with joint A/N feedback may be used, for example, when two TRPs have good backhaul (e.g., with relatively low/negligible latency).

Example PUCCH Reset after Per-TRP Beam Failure Recovery

In some cases, a UE communicating with multiple transmitter receiver points (TRPs or mTRP) may detect a beam failure for one of the TRPs. In such cases, aspects of the present disclosure provide mechanisms for the UE to send a per-TRP beam failure recovery request (BFRQ), meaning a BFRQ specific to the failing TRP, and to determine timing for performing a beam reset for physical uplink control channel (PUCCH) transmissions in such cases.

In some cases, a UE may detect a beam failure, for example, based on degradation of certain reference signals (RS) transmitted for beam management purposes, such as beam failure detection reference signal (BFD-RS). Each BFD-RS may be associated with a value of a CORESET pool index, when UE is configured with multiple TRP operation (e.g., with each TRP associated with a different CORESET pool index value). When a beam failure is detected, a UE may send a beam failure recovery request (BFRQ) that may include an indication of a new beam (e.g., a new beam selected based on SSB or RS measurements).

After sending a BFRQ, the UE may need to identify a new beam to use, for example, for PUCCH transmissions (e.g., carrying A/N feedback as shown in FIG. 7B). This process may be referred to as a beam reset (relative to a previously used beam that failed). In some cases, the UE may use a default beam until a new beam is explicitly signaled by the network (e.g., and activated via a MAC CE).

For example, for a primary cell (PCell) or Primary Secondary cell (PSCell), some time after detecting a beam failure (e.g., after 28 symbols from a last symbol of a first PDCCH reception in a search space set provided by recoverySearchSpaceId for which the UE detects a DCI format with CRC scrambled by C-RNTI or MCS-C-RNTI and until the UE receives an activation command for PUCCH-SpatialRelationInfo or is provided PUCCH-SpatialRelationInfo for PUCCH resource(s)), the UE may be configured to transmit a PUCCH on a same cell as the PRACH transmission using a same spatial filter (beam) as for the last PRACH transmission and with power determined in a defined manner.

For PUCCH beam reset in a secondary cell (SCell), some time after detecting a beam failure (e.g., after 28 symbols from a last symbol of a PDCCH reception with a DCI format scheduling a PUSCH transmission with a same HARQ process number as for the transmission of the first PUSCH and having a toggled NDI field value), the UE may monitor PDCCH in all CORESETs on the SCell(s) indicated by the MAC CE using the same antenna port quasi co-location (QCL) parameters as the ones associated with the corresponding index(es) qnew, if any. The UE may transmit PUCCH on a PUCCH-SCell using a same spatial domain filter as the one corresponding to qnew for periodic CSI-RS or SS/PBCH block reception and with determined in a defined manner, if the UE is provided PUCCH-SpatialRelationInfo for the PUCCH, a PUCCH with the LRR was either not transmitted or was transmitted on the PCell or the PSCell, and the PUCCH-SCell is included in the SCell(s) indicated by the MAC-CE.

As described above with reference to FIGS. 7A and 7B, for mTRP operation in PUCCH-SCell, PUCCH transmission may be scheduled by DCI from either TRP. Which TRP receives the PUCCH may depend on spatial relation (beam) information of the PUCCH. In the example shown in FIG. 7B, spatial relation information for PUCCH1 results in the UE using beam 1 for transmission, such that PUCCH1 reaches TRP1, while spatial relation information for PUCCH2 results in the UE using beam 2 for transmission, such that PUCCH2 reaches TRP2. In most cases, the UE is not aware which TRP receives the PUCCH.

When per-TRP BFR is supported, one potential issue is how the UE is to reset PUCCH beam after BFR. For example the UE may need to determine what beam to use for PUCCH transmissions after detecting a beam failure on one of the TRPs (e.g., when sending separate A/N feedback in PUCCH-SCell, as well as when sending joint A/N feedback in PUCCH-Scell).

If one TRP has a beam failure, the other TRP may be still good and, thus, the PUCCH associated with the good TRP may still work (e.g., with the same spatial filter information). Thus, it may not be beneficial to follow a conventional approach to reset the beam and power control parameters for all PUCCH transmissions (e.g., for both TRPs).

Aspects of the present disclosure provide mechanisms for a UE to determine PUCCH beam reset procedures after sending a per-TRP beam failure recovery request (BFRQ).

FIG. 8 illustrates example operations 800 for wireless communications, in accordance with certain aspects of the present disclosure. The operations 800 may be performed, for example, by a UE (e.g., such as a UE 120 in the wireless communication network 100).

Operations 800 begin, at 802, by transmitting, while communicating with at least a first transmitter receiver point (TRP) associated with a first control resource set (CORESET) and a second TRP associated with a second CORESET, a beam failure recovery request (BFRQ) for the first TRP. At 804, the UE receives a beam failure response (BFR) after transmitting the BFRQ. At 806, after receiving the BFR, the UE transmits physical uplink control channel (PUCCH) associated with the first TRP using a new beam indicated in the BFRQ.

FIG. 9 illustrate example operations 900 for wireless communications that may be considered complementary to operations 800 of FIG. 8. For example, operations 900 may be performed by a network entity (e.g., such as TRP shown in FIG. 7A or 7B, or a corresponding gNB or a CU/DU in control of multiple TRPs) to receive and process a BFRQ from a UE performing operations 800 of FIG. 8.

Operations 900 begin, at 902, by receiving from a user equipment (UE), while the UE is communicating with at least a first transmitter receiver point (TRP) associated with a first control resource set (CORESET) and a second TRP associated with a second CORESET, a beam failure recovery request (BFRQ) for the first TRP. At 904, the network entity transmits a beam failure response (BFR) to the UE after receiving the BFRQ. At 906, the network entity, after transmitting the BFR, processes physical uplink control channel (PUCCH) from the UE associated with the first TRP using a new beam indicated in the BFRQ.

Figure 10:
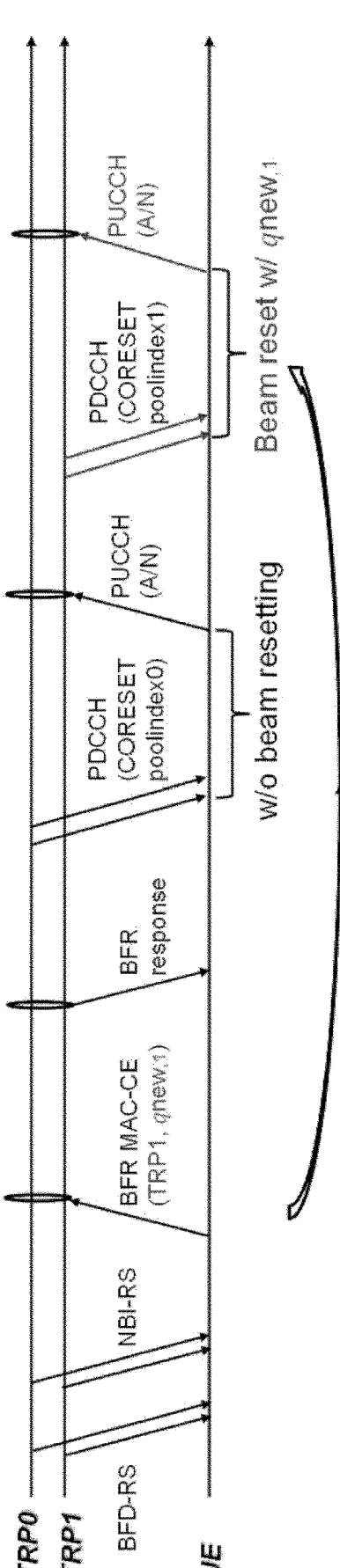
FIG. 10 illustrates an example of PUCCH beam failure recovery, in accordance with certain aspects of the present disclosure.

Operations 800 and 900 of FIGS. 8 and 9 may be understood with reference to FIG. 10, which shows an example timeline for PUCCH beam reset for a UE in communication with two TRPs (TRP0 and TRP1). The example assumes mDCI based M-TRP, with separate A/N feedback provided to the TRPs.

To recover under per-TRP BFR, it may be beneficial to reset the beam for PUCCH transmissions associated with the failed TRP with new beam information. The UE in the example of FIG. 10 may be configured with ackNACKFeedbackMode=separate for mDCI based M-TRP operation.

In the illustrated example, the UE detects a beam failure on TRP1 and transmits a TRP-specific BFRQ. As illustrated, the BFRQ may be sent in a BFR MAC-CE and may provide the information qnew for the TRP in PUCCH-Scell.

For PUCCH beam reset (for TRP1 in this example), after a given time (e.g., after 28 symbols from the BFR response, the UE may transmit the PUCCH associated with the failed TRP (TRP1 in this example) using a same spatial domain filter as the one corresponding to qnew for periodic CSI-RS or SS/PBCH block reception provided to the failed TRP (in the BFRQ), until UE receives an activation command for the PUCCH-SpatialRelationInfo.

For example, the PUCCH transmission may be determined to be associated with the failed TRP if the scheduling DCI is transmitted in a CORESET with a CORESET pool index corresponding to the failed TRP.

This approach for PUCCH beam reset may be applied to both Type1 and Type2 HARQ A/N codebook.

As noted above, TRP0/1 and the two sets of BFD-RS/NBI RS may be associated with CORESET pool index 0/1, respectively, and the UE may not actually know which TRP receives an uplink signal (it may be up to gNB scheduling).

In some cases, the BFR response may be conveyed via a PDCCH with a DCI format scheduling a PUSCH transmission with a same HARQ ID as for the transmission of the BFR MAC-CE and having a toggled NDI field value. Thus, the UE may be able to recognize the BFR response to the BFRQ, based on the matching HARQ ID.

As illustrated in FIG. 10, as the beam failure was only detected for TRP1, the PUCCH for TRP0 (associated with CORESET pool index 0) may be sent without beam resetting. The PUCCH for TRP1 (associated with CORESET pool index 1), on the other hand, may be sent with the PUCCH beam reset (e.g., based on qnew1 indicated in the BFRQ) until an explicit indication of a new beam (e.g., via MAC CE activation).

Figure 11:
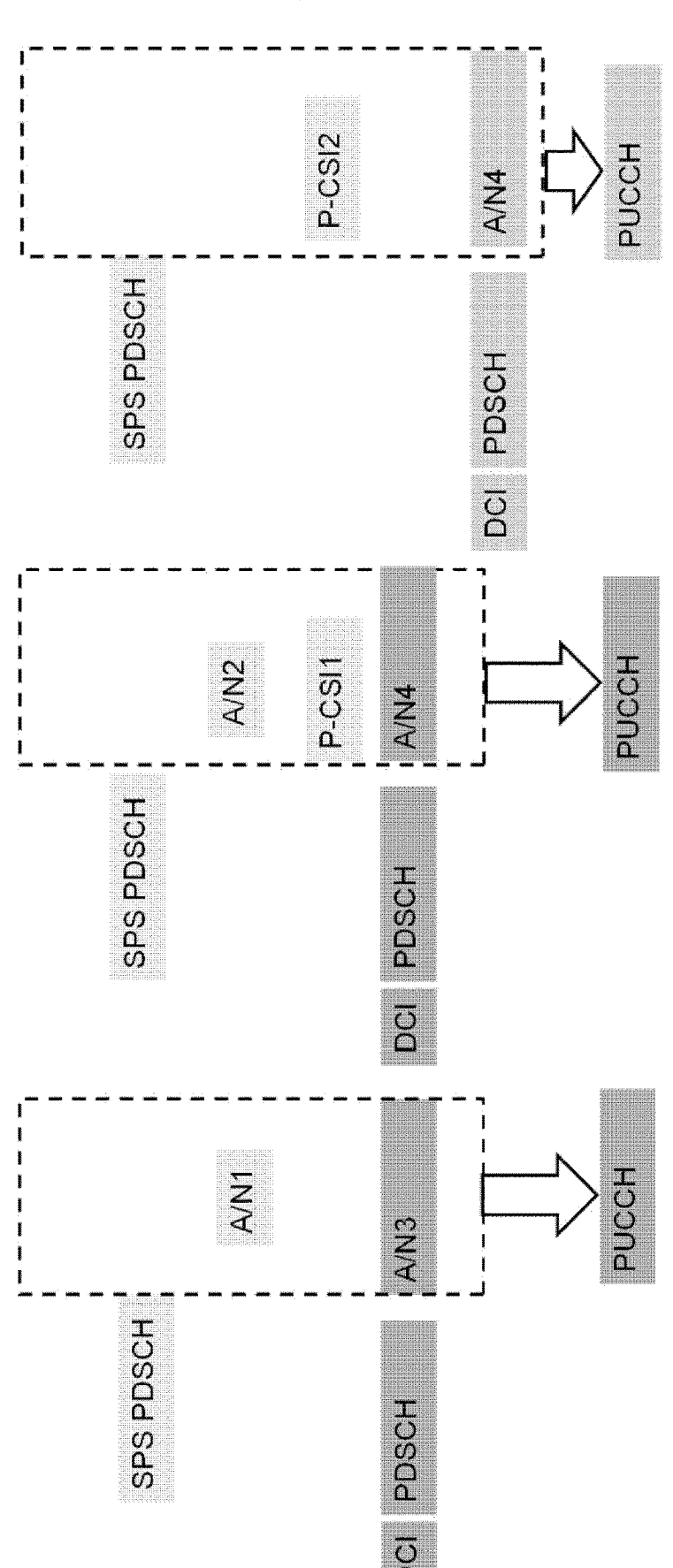
FIG. 11 illustrates example PUCCH conveyed feedback, in accordance with certain aspects of the present disclosure.

FIG. 11 illustrates how per-TRP A/N feedback may be conveyed, to acknowledge PDSCH transmissions scheduled via DCI (e.g., from each TRP). As illustrated, semi-persistent scheduled (SPS) PDSCH transmissions may also be sent and acknowledged.

Figure 12:
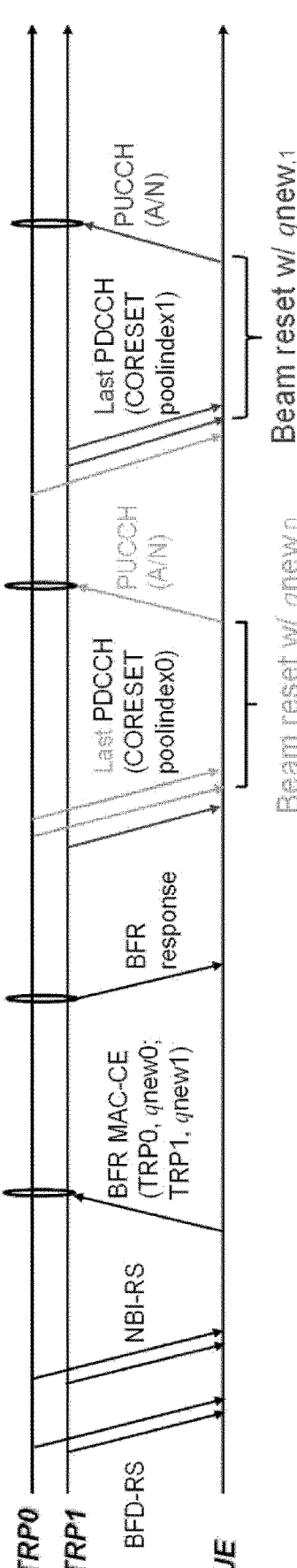
FIGS. 12-14 illustrate examples of PUCCH beam failure recovery, in accordance with certain aspects of the present disclosure.

FIG. 12 shows another example timeline for PUCCH beam reset for mDCI based M-TRP with a UE configured for joint A/N feedback. For example, a gNB can schedule joint A/N to be transmitted to either TRP under BFR (e.g., the UE may be configured with ackNACKFeedbackMode=joint for mDCI based M-TRP operation).

In the case that only a single TRP fails in a PUCCH-Scell, the UE may not reset the PUCCH beam after BFR response. For example, the gNB may schedule a PUCCH with joint A/N to be transmitted to the other surviving TRP.

If both TRPs fail in PUCCH-Scell, and if the UE has transmitted TRP-specific BFRQs for both TRPs and provided respective information qnew,i (i=0,1 for TRP0/CORESET pool index 0 and TRP1/CORESET pool index 0), if any, corresponding to the failed TRP.

For PUCCH beam reset (for TRP1 in this example), after a given time (e.g., after 28 symbols from the BFR response), the UE may transmit the PUCCH associated with the failed TRP using a same spatial domain filter as the one corresponding to qnew,i for periodic CSI-RS or SS/PBCH block reception provided to the failed TRP until an explicit indication of a new beam is provided (e.g., until the UE receives an activation command for the PUCCH-SpatialRelationInfo).

As noted above, the PUCCH transmission may be determined to be associated with the failed TRP if the last DCI determining the PUCCH resource is transmitted in a CORE-SET with a CORESET pool index corresponding to the failed TRP. Above applies to both Type1 and Type2 joint HARQ A/N codebook. The PUCCH transmission is determined to be associated with the failed TRP if the last DCI determining the PUCCH resource for carrying the joint HARQ A/N codebook in a slot is transmitted in a CORESET with a CORESET pool index corresponding to the failed TRP. In carrier aggregation, when the last DCI is transmitted in a serving cell configured without any CORESET pool index, the last DCI may be treated as if transmitted associated with a default CORESET pool index, e.g., CORESET pool index=0, for determining the new beam for the PUCCH transmission.

In the example illustrated in FIG. 11, the UE sends a BFRQ that indicates a beam failure for both TRP0 and TRP1 and corresponding new beam information (qnew0 and qnew1). Thus, at a given time after the BFR response, the UE transmits PUCCH for TRP1 with beam reset. In the example illustrated in FIG. 11, the UE sends a BFRQ that indicates a beam failure for both TRP0 and TRP1 and corresponding new beam information (qnew0 and qnew1). Thus, at a given time after the BFR response, the UE transmits PUCCH for TRP0 with beam reset with qnew0 and transmits PUCCH for TRP1 with beam reset with qnew1.

Figure 13:
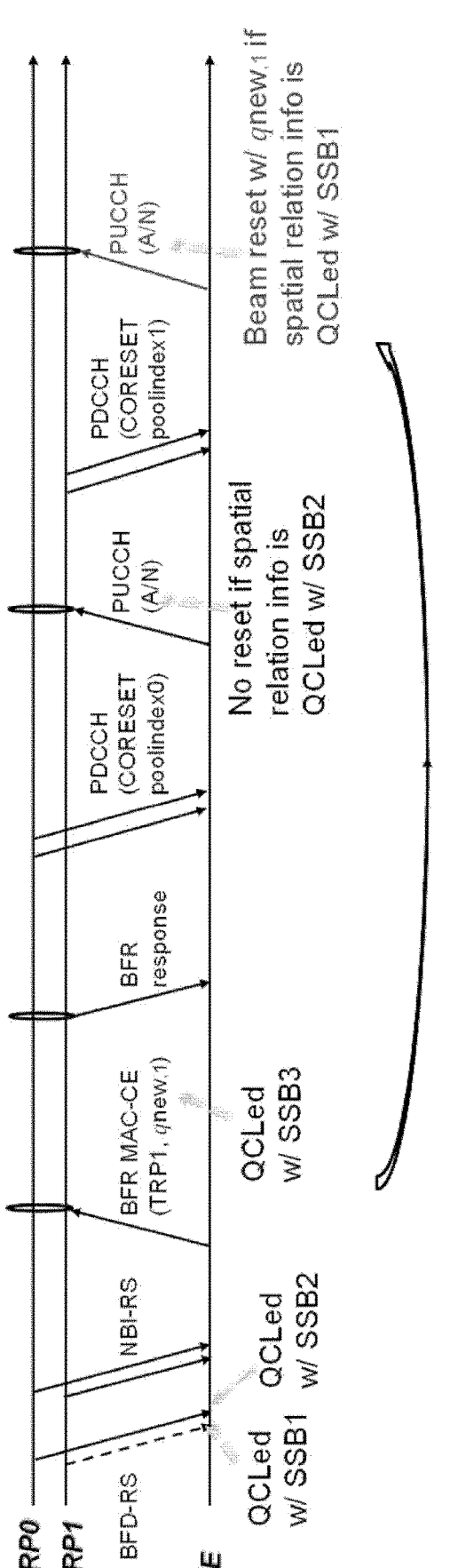

FIG. 13 shows another example timeline for PUCCH beam reset for mDCI based M-TRP, where each TRP may be associated with a different subset of SSBs. Again, to recover under per-TRP BFR, it may beneficial to reset the beam for PUCCH transmissions associated with the failed TRP with new beam information.

In this case, the UE may be configured with mDCI based M-TRP operation, if the UE has transmitted a TRP-specific BFRQ and has provided the information qnew for the TRP in PUCCH-Scell. The illustrated example assumes a beam failure on TRP1 and the UE provides qnew,1 in the BFRQ).

Some time after the BFR response (e.g., 28 symbols), the UE may transmit the PUCCH associated with the failed TRP using a same spatial domain filter as the one corresponding to qnew for periodic CSI-RS or SS/PBCH block reception provided to the failed TRP, until UE receives an activation command for the PUCCH-SpatialRelationInfo.

The PUCCH transmission may be determined to be associated with the failed TRP if the spatial relation info of the PUCCH and any of the beam failure detection (BFD) RS in the set of BFD-RS are quasi co-located (QCLed) to the same SSB. In the illustrated example, PUCCH for TRP1 (CORESET pool index 1) is sent with a beam reset with qnew, 1 assuming the spatial information is QCLed with SSB1).

As noted above, for single TRP scenarios, a UE typically resets PUCCH power control parameter closeloopindex to a default value, e.g., 1=0, for all PUCCH transmissions. In mDCI based M-TRP, however, each PUCCH may be configured with a closeloopindex for power control. For example, a gNB may configure each PUCCH with different closeloopindex, to be associated with a different TRP.

To recover under per-TRP BFR, it may be beneficial for a UE under BFR to maintain closeloopindex without resetting, since the gNB may associate a particular closeloopindex with a particular TRP.

Figure 14:
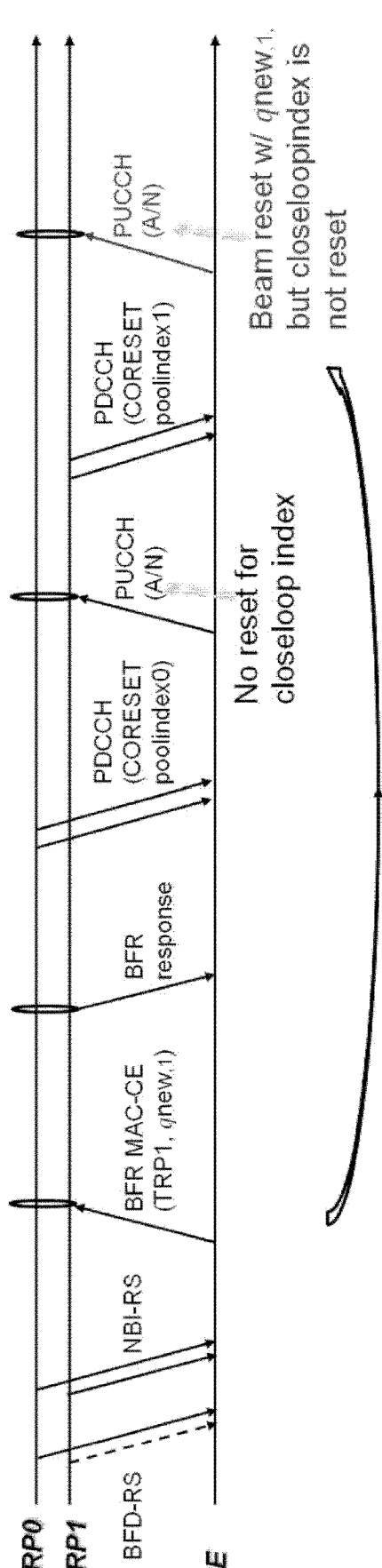

FIG. 14 shows another example timeline for PUCCH beam reset for mDCI based M-TRP, where closeloopindex is maintained for the TRP under BFR. The illustrated example assumes a beam failure is detected for TRP1 and the UE sends a TRP-specific BFRQ, indicating TRP1 and new beam information qnew, 1.

For this case, where the UE configured with mDCI based M-TRP operation, has transmitted a TRP-specific BFRQ and provided the information qnew for the TRP in PUCCH-Scell, after a given time (e.g., 28 symbols from the BFR response), the UE may transmit the PUCCH associated with the failed TRP using a same closeloopindex as configured or activated in the spatial relation info for the PUCCH before the BFR. In other words, as illustrated, the PUCCH may be sent with beam reset with the qnew, 1 indicated in the BFRQ, but the closeloopindex is not reset.

FIG. 15 illustrates a communications device 1500 that may include various components (e.g., corresponding to means-plus-function components) configured to perform operations for the techniques disclosed herein, such as the operations illustrated in FIG. 8. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 8. In certain aspects, computer-readable medium/memory 1512 stores code 1514 for outputting, for transmission while communicating with at least a first transmitter receiver point (TRP) associated with a first control resource set (CORESET) and a second TRP associated with a second CORESET, a beam failure recovery request (BFRQ) for the first TRP; code 1516 for obtaining a beam failure response (BFR) after transmitting the BFRQ; and code 1518 for, after obtaining the BFR, outputting for transmission physical uplink control channel (PUCCH) associated with the first TRP using a new beam indicated in the BFRQ. In certain aspects, the processor 1504 has circuitry configured to implement the code stored in the computer-readable medium/memory 1512. The processor 1504 includes circuitry 1520 for outputting, for transmission while communicating with at least a first transmitter receiver point (TRP) associated with a first control resource set (CORESET) and a second TRP associated with a second CORESET, a beam failure recovery request (BFRQ) for the first TRP; circuitry 1522 for obtaining a beam failure response (BFR) after transmitting the BFRQ; and circuitry 1524 for, after obtaining the BFR, outputting for transmission physical uplink control channel (PUCCH) associated with the first TRP using a new beam indicated in the BFRQ.

Figure 16:
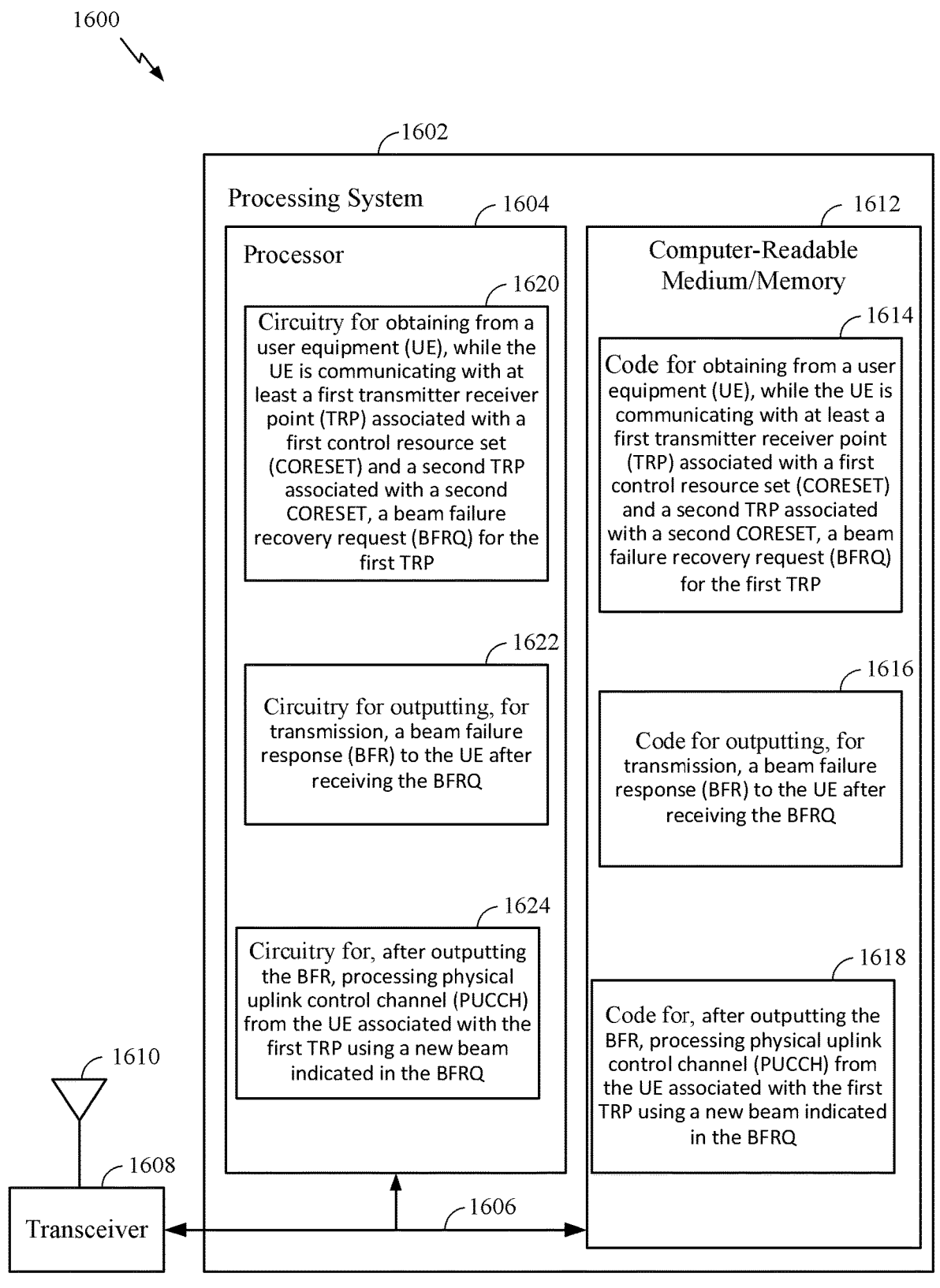
FIG. 16 illustrates an apparatus with example components capable of performing operations, in accordance with certain aspects of the present disclosure.

FIG. 16 illustrates a communications device 1600 that may include various components (e.g., corresponding to means-plus-function components) configured to perform operations for the techniques disclosed herein, such as the operations illustrated in FIG. 9. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 9. In certain aspects, computer-readable medium/memory 1612 stores code 1614 for obtaining from a user equipment (UE), while the UE is communicating with at least a first transmitter receiver point (TRP) associated with a first control resource set (CORESET) and a second TRP associated with a second CORESET, a beam failure recovery request (BFRQ) for the first TRP; code 1616 for outputting, for transmission, a beam failure response (BFR) to the UE after obtaining the BFRQ; and code 1618 for, after outputting the BFR, processing physical uplink control channel (PUCCH) from the UE associated with the first TRP using a new beam indicated in the BFRQ. In certain aspects, the processor 1604 has circuitry configured to implement the code stored in the computer-readable medium/memory 1612. The processor 1604 includes circuitry 1620 for obtaining from a user equipment (UE), while the UE is communicating with at least a first transmitter receiver point (TRP) associated with a first control resource set (CORESET) and a second TRP associated with a second CORESET, a beam failure recovery request (BFRQ) for the first TRP; circuitry 1622 for outputting, for transmission to the UE after obtaining the BFRQ, a beam failure response (BFR); and circuitry 1624 for, after outputting the BFR, processing physical uplink control channel (PUCCH) from the UE associated with the first TRP using a new beam indicated in the BFRQ.

EXAMPLE ASPECTS

Implementation examples are described in the following numbered aspects.

Aspect 1: A method for wireless communications by a user equipment (UE), comprising: transmitting, while communicating with at least a first transmitter receiver point (TRP) associated with a first control resource set (CORESET) and a second TRP associated with a second CORESET, a beam failure recovery request (BFRQ) for the first TRP; receiving a beam failure response (BFR) after transmitting the BFRQ; and after receiving the BFR, transmitting physical uplink control channel (PUCCH) associated with the first TRP using a new beam indicated in the BFRQ.

Aspect 2: The method of Aspect 1, further comprising continuing, after transmitting the BFRQ, to transmit PUCCH associated with the second TRP using a beam used prior to transmitting the BFRQ.

Aspect 3: The method of any of Aspects 1-2, wherein the UE transmits the PUCCH associated with the first TRP using the new beam indicated in the BFRQ until the UE receives an activation command for updated spatial relation information for the PUCCH associated with the first TRP.

Aspect 4: The method of any of Aspects 1-3, wherein the BFRQ indicates the first TRP via a CORESET pool index identifying the first CORESET.

Aspect 5: The method of any of Aspects 1-4, wherein the new beam indicated in the BFRQ is associated with a beam failure detection (BFD) reference signal (RS).

Aspect 6: The method of any of Aspects 1-5, further comprising providing acknowledgement feedback for downlink control information (DCI) scheduled transmissions in the first TRP and the second TRP via separate PUCCH transmissions.

Aspect 7: The method of Aspect 6, wherein the BFR is conveyed via a downlink control information (DCI) format scheduling a physical uplink shared channel (PUSCH) with a same hybrid automatic repeat request (HARQ) ID as for transmission of a medium access control (MAC) control element (CE) used to convey the BFRQ.

Aspect 8: The method of any of Aspects 1-7, further comprising providing joint acknowledgement feedback for downlink control information (DCI) scheduled transmissions in the first TRP and the second TRP jointly via common PUCCH transmissions.

Aspect 9: The method of Aspect 8, further comprising receiving signaling scheduling a physical uplink control channel (PUCCH) to provide the joint acknowledgment feedback to the second TRP.

Aspect 10: The method of any of Aspects 1-9, further comprising: transmitting a BFRQ for the second TRP.

Aspect 11: The method of any of Aspects 1-10, wherein: the new beam indicated in the BFRQ is associated with a periodic channel state information (CSI) reference signal (CSI-RS) or synchronization signal block (SSB) or physical broadcast channel (PBCH).

Aspect 12: The method of any of Aspects 1-11, wherein the UE transmits the PUCCH associated with the first TRP using a same closed loop power control parameter as configured or activated in spatial relation information for the PUCCH before transmitting the BFRQ.

Aspect 13: A method for wireless communications by a network entity, comprising: receiving from a user equipment (UE), while the UE is communicating with at least a first transmitter receiver point (TRP) associated with a first control resource set (CORESET) and a second TRP associated with a second CORESET, a beam failure recovery request (BFRQ) for the first TRP; transmitting a beam failure response (BFR) to the UE after receiving the BFRQ; and after transmitting the BFR, processing physical uplink control channel (PUCCH) from the UE associated with the first TRP using a new beam indicated in the BFRQ.

Aspect 14: The method of Aspect 13, wherein the network entity processes the PUCCH associated with the first TRP using the new beam indicated in the BFRQ until the network entity sends an activation command for updated spatial relation information for the PUCCH associated with the first TRP.

Aspect 15: The method of any of Aspects 13-14, wherein the BFRQ indicates the first TRP via a CORESET pool index identifying the first CORESET.

Aspect 16: The method of any of Aspects 13-15, wherein the new beam indicated in the BFRQ is associated with a beam failure detection (BFD) reference signal (RS).

Aspect 17: The method of any of Aspects 13-16, further comprising receiving acknowledgement feedback for downlink control information (DCI) scheduled transmissions in the first TRP in a PUCCH transmission separate from a PUCCH transmission with acknowledgement feedback for the second TRP.

Aspect 18: The method of Aspect 17, wherein the BFR is conveyed via a downlink control information (DCI) format scheduling a physical uplink shared channel (PUSCH) with a same hybrid automatic repeat request (HARQ) ID as for transmission of a medium access control (MAC) control element (CE) used to convey the BFRQ.

Aspect 19: The method of any of Aspects 13-18, further comprising receiving joint acknowledgement feedback for downlink control information (DCI) scheduled transmissions in the first TRP and the second TRP jointly via common PUCCH transmissions.

Aspect 20: The method of Aspect 19, further comprising transmitting signaling scheduling a physical uplink control channel (PUCCH) to provide the joint acknowledgment feedback to the second TRP.

Aspect 21: The method of any of Aspects 13-20, wherein: the new beam indicated in the BFRQ is associated with a periodic channel state information (CSI) reference signal (CSI-RS) or synchronization signal block (SSB) or physical broadcast channel (PBCH).

Aspect 22: The method of any of Aspects 13-21, wherein the network entity processes the PUCCH associated with the first TRP using a same closed loop power control parameter as configured or activated in spatial relation information for the PUCCH before transmitting the BFRQ.

Aspect 23: A user equipment, comprising means for performing the operations of one or more of Aspects 1-12.

Aspect 24: A user equipment, comprising a transceiver and a processing system including at least one processor configured to perform the operations of one or more of 1-12.

Aspect 25: An apparatus for wireless communications by a user equipment, comprising: a processing system configured to communicate with at least a first transmitter receiver point (TRP) associated with a first control resource set (CORESET) and a second TRP associated with a second CORESET, and generate a beam failure recovery request (BFRQ) for the first TRP; an interface configured to output, for transmission while communicating, the beam failure recovery request (BFRQ) for the first TRP, obtain a beam failure response (BFR) after the transmission of the BFRQ, and after the BFR was received, output, for transmission, physical uplink control channel (PUCCH) associated with the first TRP using a new beam indicated in the BFRQ.

Aspect 26: A computer-readable medium for wireless communications by a user equipment, comprising codes executable to: output, for transmission while communicating with at least a first transmitter receiver point (TRP) associated with a first control resource set (CORESET) and a second TRP associated with a second CORESET, a beam failure recovery request (BFRQ) for the first TRP; obtain a beam failure response (BFR) after the BFRQ was output for transmission; and after the BFR was obtained, output for transmission, physical uplink control channel (PUCCH) associated with the first TRP using a new beam indicated in the BFRQ.

Aspect 27: A network entity, comprising means for performing the operations of one or more of Aspects 13-22.

Aspect 28: A network entity, comprising a transceiver and a processing system including at least one processor configured to perform the operations of one or more of 13-22.

Aspect 29: An apparatus for wireless communications by a network entity, comprising: an interface configured to obtain from a user equipment (UE), while the UE is communicating with at least a first transmitter receiver point (TRP) associated with a first control resource set (CORESET) and a second TRP associated with a second CORESET, a beam failure recovery request (BFRQ) for the first TRP; and a processing system configured to generate a beam failure response (BFR), wherein the interface is further configured to output, for transmission to the UE after the BFRQ was obtained, the beam failure response (BFRQ), and after the BFR was output for transmission, the processing system is further configured to process physical uplink control channel (PUCCH) from the UE associated with the first TRP using a new beam indicated in the BFRQ.

Aspect 30: A computer-readable medium for wireless communications by a network entity, comprising codes executable to: obtain from a user equipment (ULE), while the UE is communicating with at least a first transmitter receiver point (TRP) associated with a first control resource set (CORESET) and a second TRP associated with a second CORESET, a beam failure recovery request (BFRQ) for the first TRP; generate a beam failure response (BFR); output, for transmission to the UE after the BFRQ was obtained, the beam failure response (BFRQ); and after the BFR was output for transmission, processing physical uplink control channel (PUCCH) from the UE associated with the first TRP using a new beam indicated in the BFRQ.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, processors 458, 464 and 466, and/or controller/processor 480 of the UE 120 and/or processors 420, 430, 438, and/or controller/processor 440 of the BS 110 shown in FIG. 4 may be configured to perform operations 1500 of FIG. 15 and/or operations 1600 of FIG. 16.

Means for receiving may include a transceiver, a receiver or at least one antenna and at least one receive processor illustrated in FIG. 4. Means for transmitting, means for sending or means for outputting may include, a transceiver, a transmitter or at least one antenna and at least one transmit processor illustrated in FIG. 4. Means for providing and means for processing may include a processing system, which may include one or more processors, such as processors 458, 464 and 466, and/or controller/processor 480 of the UE 120 and/or processors 420, 430, 438, and/or controller/ processor 440 of the BS 110 shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7, and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   transmitting, while communicating with at least a first transmitter receiver point (TRP) associated with a first control resource set (CORESET) and a second TRP associated with a second CORESET, a beam failure recovery request (BFRQ) for the first TRP;
   receiving a beam failure response (BFR) after transmitting the BFRQ; and
   after receiving the BFR, transmitting physical uplink control channel (PUCCH) associated with the first TRP using a new beam indicated in the BFRQ, wherein the PUCCH associated with the first TRP is transmitted using a same closed loop power control parameter as configured or activated in spatial relation information for the PUCCH before transmitting the BFRQ.

2. The method of claim 1, further comprising continuing, after transmitting the BFRQ, to transmit PUCCH associated with the second TRP using a beam used prior to transmitting the BFRQ.

3. The method of claim 1, wherein the UE transmits the PUCCH associated with the first TRP using the new beam indicated in the BFRQ until the UE receives an activation command for updated spatial relation information for the PUCCH associated with the first TRP.

4. The method of claim 1, wherein the BFRQ indicates the first TRP via a CORESET pool index identifying the first CORESET.

5. The method of claim 1, wherein the new beam indicated in the BFRQ is associated with a beam failure detection (BFD) reference signal (RS).

6. The method of claim 1, further comprising providing acknowledgement feedback for downlink control information (DCI) scheduled transmissions in the first TRP and the second TRP via separate PUCCH transmissions.

7. The method of claim 6, wherein the BFR is conveyed via a downlink control information (DCI) format scheduling a physical uplink shared channel (PUSCH) with a same hybrid automatic repeat request (HARQ) ID as for transmission of a medium access control (MAC) control element (CE) used to convey the BFRQ.

8. The method of claim 1, further comprising providing joint acknowledgement feedback for downlink control information (DCI) scheduled transmissions in the first TRP and the second TRP jointly via common PUCCH transmissions.

9. The method of claim 8, further comprising receiving signaling scheduling a physical uplink control channel (PUCCH) to provide the joint acknowledgment feedback to the second TRP.

10. The method of claim 1, further comprising:
transmitting a BFRQ for the second TRP.

11. The method of claim 1, wherein:
the new beam indicated in the BFRQ is associated with a periodic channel state information (CSI) reference signal (CSI-RS) or synchronization signal block (SSB) or physical broadcast channel (PBCH).

12. A method for wireless communications by a network entity, comprising:
receiving from a user equipment (UE), while the UE is communicating with at least a first transmitter receiver point (TRP) associated with a first control resource set (CORESET) and a second TRP associated with a second CORESET, a beam failure recovery request (BFRQ) for the first TRP;
transmitting a beam failure response (BFR) to the UE after receiving the BFRQ; and
after transmitting the BFR, processing physical uplink control channel (PUCCH) from the UE associated with the first TRP using a new beam indicated in the BFRQ and a same closed loop power control parameter as configured or activated in spatial relation information for the PUCCH before transmitting the BFRQ.

13. The method of claim 12, wherein the network entity processes the PUCCH associated with the first TRP using the new beam indicated in the BFRQ until the network entity sends an activation command for updated spatial relation information for the PUCCH associated with the first TRP.

14. The method of claim 12, wherein the BFRQ indicates the first TRP via a CORESET pool index identifying the first CORESET.

15. The method of claim 12, wherein the new beam indicated in the BFRQ is associated with a beam failure detection (BFD) reference signal (RS).

16. The method of claim 12, further comprising receiving acknowledgement feedback for downlink control information (DCI) scheduled transmissions in the first TRP in a PUCCH transmission separate from a PUCCH transmission with acknowledgement feedback for the second TRP.

17. The method of claim 16, wherein the BFR is conveyed via a downlink control information (DCI) format scheduling a physical uplink shared channel (PUSCH) with a same hybrid automatic repeat request (HARQ) ID as for transmission of a medium access control (MAC) control element (CE) used to convey the BFRQ.

18. The method of claim 12, further comprising receiving joint acknowledgement feedback for downlink control information (DCI) scheduled transmissions in the first TRP and the second TRP jointly via common PUCCH transmissions.

19. The method of claim 18, further comprising transmitting signaling scheduling a physical uplink control channel (PUCCH) to provide the joint acknowledgment feedback to the second TRP.

20. The method of claim 12, wherein:
the new beam indicated in the BFRQ is associated with a periodic channel state information (CSI) reference signal (CSI-RS) or synchronization signal block (SSB) or physical broadcast channel (PBCH).

21. An apparatus for wireless communications by a user equipment, comprising:
a processing system configured to:
communicate with at least a first transmitter receiver point (TRP) associated with a first control resource set (CORESET) and a second TRP associated with a second CORESET; and
generate a beam failure recovery request (BFRQ) for the first TRP;
an interface configured to:
output, for transmission while communicating, the beam failure recovery request (BFRQ) for the first TRP;
obtain a beam failure response (BFR) after the transmission of the BFRQ; and
after the BFR was received, output, for transmission, physical uplink control channel (PUCCH) associated with the first TRP using a new beam indicated in the BFRQ, wherein the PUCCH associated with the first TRP is transmitted using a same closed loop power control parameter as configured or activated in spatial relation information for the PUCCH before transmitting the BFRQ.

22. An apparatus for wireless communications by a network entity, comprising:
an interface configured to obtain from a user equipment (UE), while the UE is communicating with at least a first transmitter receiver point (TRP) associated with a first control resource set (CORESET) and a second TRP associated with a second CORESET, a beam failure recovery request (BFRQ) for the first TRP; and
a processing system configured to generate a beam failure response (BFR), wherein:
the interface is further configured to output, for transmission to the UE after the BFRQ was obtained, the BFR; and after the BFR was output for transmission, the processing system is further configured to process physical uplink control channel (PUCCH) from the UE associated with the first TRP using a new beam indicated in the BFRQ, and a same closed loop power control parameter as configured or activated in spatial relation information for the PUCCH before transmitting the BFRQ.

23. The apparatus of claim 21, wherein the BFRQ indicates the first TRP via a CORESET pool index identifying the first CORESET.

24. The apparatus of claim 21, wherein the new beam indicated in the BFRQ is associated with a periodic channel state information (CSI) reference signal (CSI-RS) or synchronization signal block (SSB) or physical broadcast channel (PBCH).

* * * * *